April 7, 1959     N. C. WILLIAMS ET AL     2,880,754
AIR RELAY VALVE OPERABLE BY BOTH INPUT AND
EXHAUST CONTROL MEANS
Filed Dec. 19, 1955     3 Sheets-Sheet 1
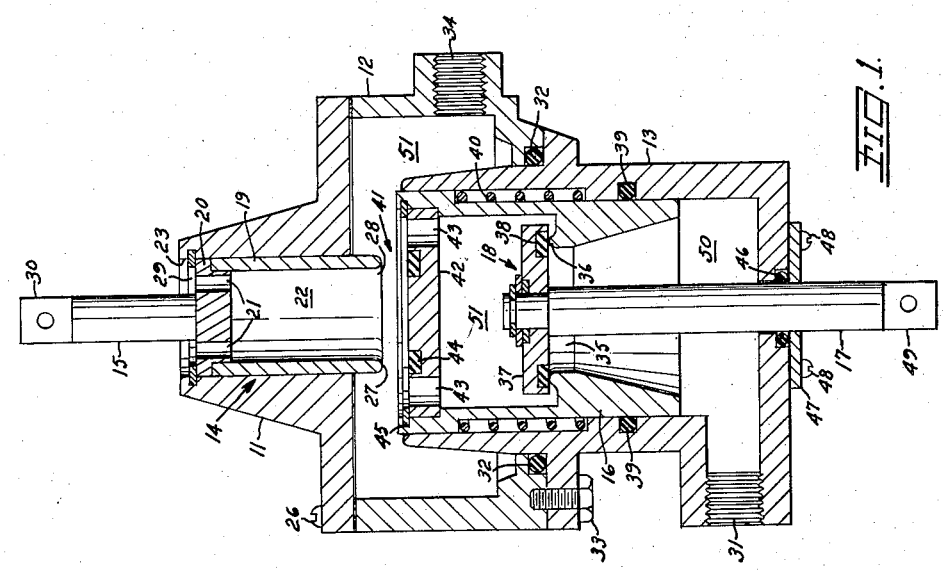
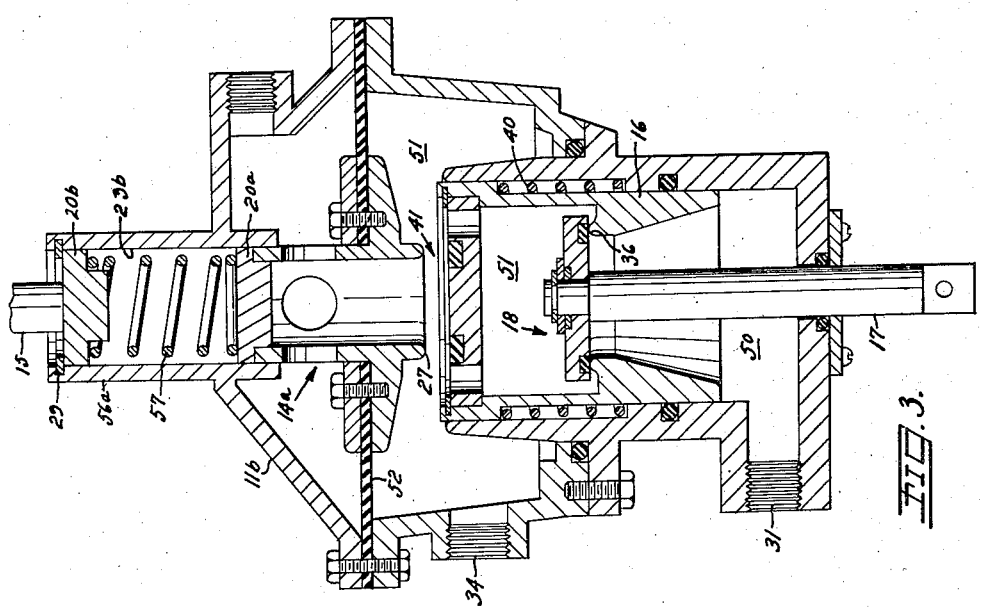
INVENTOR.
*Norman C. Williams*
BY *Rollin W. Fishwood*
*AGENT*

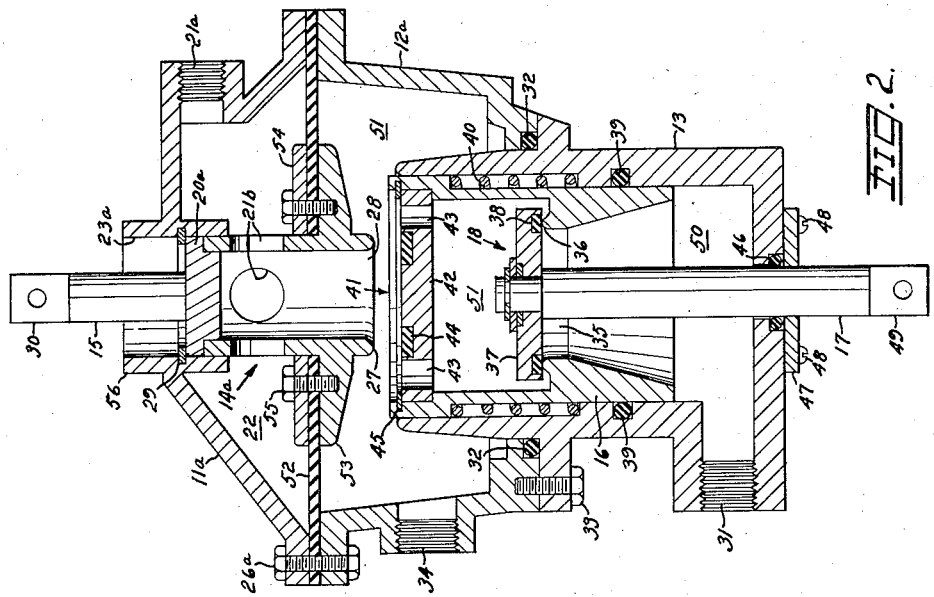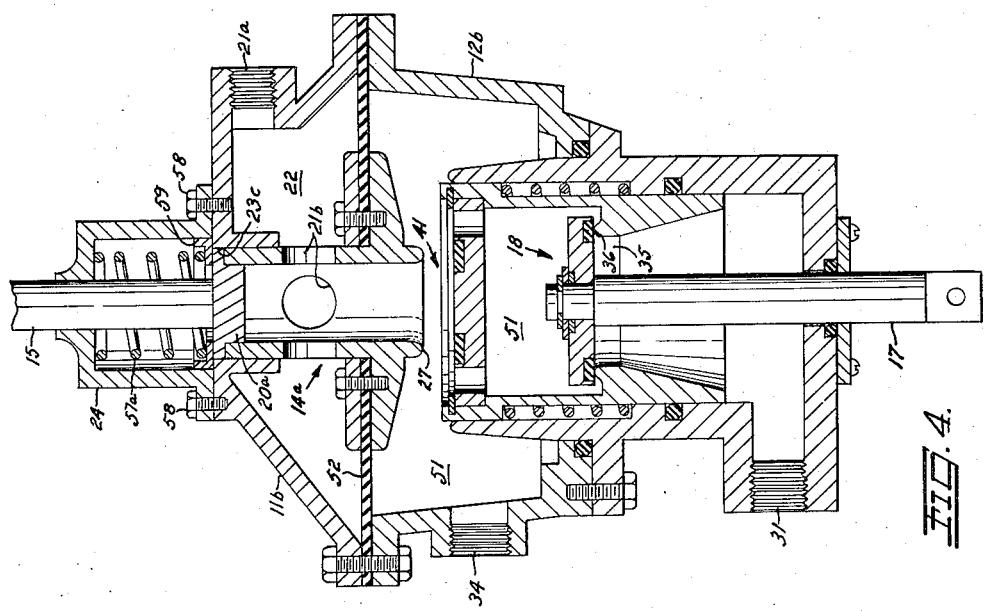

INVENTOR.
Norman C. Williams
Rollin W. Fishwood
BY
AGENT

United States Patent Office 2,880,754
Patented Apr. 7, 1959

2,880,754

AIR RELAY VALVE OPERABLE BY BOTH INPUT AND EXHAUST CONTROL MEANS

Norman C. Williams, Portland, Oreg., and Rollin W. Fishwood, Vancouver, Wash., assignors to Power Brake Equipment Company, Portland, Oreg., a corporation of Oregon Application December 19, 1955, Serial No. 553,854

15 Claims. (Cl. 137—620)

This invention relates generally to a basic valve structure for an air control system and includes all those additional valve structures which use the basic structure in combination with additional structures which give additional or modified functions to the basic structure.

It is a primary object of the invention to provide a basic air control structure having a pair of axially aligned valve mechanisms with means for operating the valve mechanisms overlappingly from either end of the structure. By "overlappingly" it is meant that neither one of the pair of valve mechanisms may be opened if the other is already open.

It is a second object to provide such a basic structure in which one of the valve mechanisms is a main valve operable alternately for the purpose of permitting or preventing air to be admitted from a source of air under pressure to an air motor or load device and in which the other of the valve mechanisms is an exhaust valve operable alternately for the purpose of preventing or permitting air to be discharged from said air motor or load device to the atmosphere.

It is a third object to provide such a basic structure with a respective pair of valve operators either of which is axially movable to operate said valves in sequence first to close one of the valves and second to open the other of the valves, said operators being oppositely movable to accomplish a given sequence of operation of the two valves.

It is a fourth object to provide such a basic valve structure in which the air from the source of air under pressure to which the valve structure is operatively connected is adapted to bias one of said pair of valve operators towards movement in its axial direction to close said exhaust valve and open said main valve.

It is a fifth object to provide such a basic valve structure in which when said exhaust valve is closed and said main valve is open the air under pressure at said load device is effective to bias said exhaust valve towards its closed position.

It is a sixth object to provide such a basic valve structure with additional reactive means. By "reactive" means is meant means adapting the air under pressure applied by said valve structure to said air motor or load device to bias said exhaust valve towards its open position.

It is a seventh object to provide the valve structure of the sixth object with additional compensative means. By "compensative" means is meant resilient means biasing said exhaust valve towards its closed position against the bias of said reactive means.

It is an eighth object to provide such a basic structure with reactive means effective over a first range of movement of one of said valve operators and compensative means effective over a second range of movement of one of said valve operators.

It is a ninth object to provide such a valve structure with resilient means biasing said structure towards the closed position of said exhaust valve and the open position of said main valve together with means adapting said air from a source under pressure to bias said structure towards the closed position of said main valve and the open position of said exhaust valve.

It is a tenth object to provide such a valve structure with additional valve means responsive to the pressure of air from said source of air under pressure to isolate said main valve from said source of air under pressure at a pre-set minimum pressure of said air together with means connecting said main valve with a second source of air under pressure connected with said source of air under pressure when said additional valve means is open.

How these and other objects are attained is explained in the following description referring to the attached drawings in which Figure 1 is a schematic view in vertical section of the basic air control structure including essentially the mechanism of the first five stated objects of the invention.

Figure 2 is a schematic view in vertical section of the essential structure of the sixth stated object of the invention.

Figure 3 is a schematic view in vertical section of the essential structure of the seventh stated object of the invention.

Figure 4 is a schematic view in vertical section of the essential structure of the eighth stated object of the invention.

Like numerals of reference refer to like parts in the several figures of the drawings.

Figure 5:
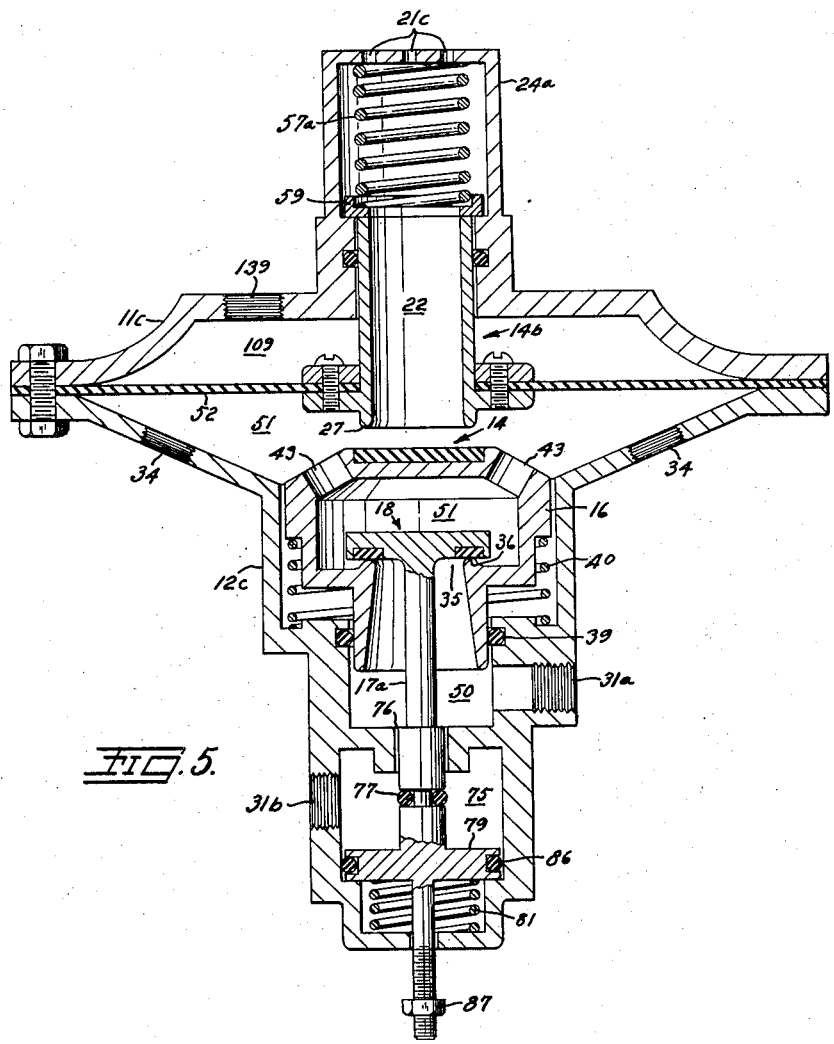
Figure 5 is a schematic view in vertical section of the essential structure of the ninth and tenth stated objects of the invention.

It should here be noted that Figure 5 is schematically identical with Figure 2 of our U.S. Patent No. 2,772,926 issued December 4, 1956, from our co-pending application Serial No. 449,831, filed August 16, 1954, of which this application is a continuation in part.

Referring now to Figure 1, the basic fluid control mechanism of this invention is seen to be housed in an upper body part 11, a middle body part 12 and a lower body part 13 and to consist essentially of an exhaust valve box 14 with its operating stem 15, a valve box 16 and a valve stem 17 carrying a valve 18.

Exhaust valve box 14 includes a cylindrical barrel 19 with an outer end head 20 carrying stem 15 and through which holes 21 lead from the interior 22 of box 14 to the atmosphere. Box 14 is slidably guided in bore 23 of upper body 11. Body parts 11 and 12 are secured together by screws 26. Exhaust valve seat 27 is formed around exhaust port 28 at the inner end of barrel 19. Exhaust valve box 14 is limited in outer movement in body part 11 by C-ring 29 and is intended to be positioned in operation as required by a manual or automatic control means linked to end 30 of operating stem 15.

Inlet opening 31 is formed in a wall of lower body part 13 sealed and secured to middle body part 12 by O-ring 32 and screws 33 respectively. Outlet port 34 is formed in a wall of body part 12 as shown.

Valve box 16 is formed with a transverse barrier having an axially aligned valve port 35 formed therethrough with valve seat 36 formed around the inner end of port 35. Valve 18 sealed and secured to stem 17 as shown includes valve disk 37 into which annular sealing ring 38 is fixed.

Sealed by O-ring 39 valve box 16 is guided for free axial movement in body part 13 as shown and biased upwardly towards exhaust box 14 by spring 40 as shown.

Exhaust valve 41, including valve disk 42 perforated by holes 43 and having annular seal ring 44 set therein, is secured into the upper end of valve box 16 by C-ring 45 as shown.

Valve stem 17 extends through the lower side of lower part 13 in which it is guided for free axial movement and sealed by O-ring 46 secured in place by washer 47 and screws 48.

In use valve body 11, 12, 13 is fixed to a support, exhaust and operating stem 15 is held in a desired operating position by external control means linked to end 30 and valve stem 17 is held in a desired operating position by external control means linked to end 49.

In the operation of the valve mechanism of Figure 1, with an air supply impressed on the mechanism at inlet 31 and a load device adapted to be air operated connected to outlet 34 and with the mechanism set as shown, air under pressure in the space 50 is separated from space 51 by valve 18 closed on seat 36. Space 51 is open to space 22 and through holes 21 to atmosphere by the separation as shown of exhaust valve 41 from its seat 27. Air under pressure in space 50 urges both valve box 16 and valve 18 upwardly against the restraint of the control means linked to stem 17. Now if it is desired to operate the load device, not shown, connected to outlet 34, the valve mechanism of Figure 1 can be operated from either end, i. e., by downward movement of stem 15 or by upward movement of stem 17. For example if stem 15 is moved downward with box 14 exhaust valve seat 27 will close on exhaust valve 41 to isolate space 51 from space 22 or atmosphere. Then continued movement of stem 15 will press valve box 16 downward moving valve seat 36 away from valve 18 and opening space 50 to space 51 or in other words passing air under pressure from inlet 31 to outlet 34. Or again if stem 17 were moved upward valve box 16 would move upward with it until valve 41 contacted its seat 27 to isolate space 51 from space 22 after which further upward movement of stem 17 would raise valve 18 from seat 36 and space 51 would be opened to space 50. And of course if the mechanism were manipulated by either of the stems 15 or 17 to close valve 41, 27 and open valve 18, 36, the reverse movement of the stem involved would reverse the valve actions to return the mechanism to the state shown in the figure. Also it should be noted that within the limits of axial movement of the two stems 15 and 17 the effect of a movement of one of the stems on the mechanism can be nullified by a simultaneous movement of the other stem of the same extent in the same direction. As the effect can be reversed by a similar but later movement of the second stem.

Referring to Figure 2, it is seen to differ from Figure 1 in the modified middle body part 12a and upper part 11a adapted to have secured between them by bolts 26a a flexible diaphragm 52 through a central hole in which extends the modified form of exhaust box 14a between whose flange 23 and large washer 54 diaphragm 52 is clamped by screws 55. Holes 21 are omitted from part 20a and functionally replaced by outlet 21a in body part 11a and holes 21b in exhaust box 14a.

It is seen that by the definition of "reactive" as given in the sixth stated object of the invention the addition of diaphragm 52 secured to valve box 14a as shown and forming one wall of space 51, the mechanism becomes reactive in so far as the air pressure in space 51 is exerted on diaphragm 52 to urge exhaust valve seat 36 away from valve 41 and if exhaust box 14a is held downwardly away from its stop, or C-ring 29, by stem 15 the upward reaction on stem 15 will be responsive to pressure variations in space 51.

It should particularly be noted that the form of control structure shown in Figure 2 is a rugged and useful form in the art since with the three part body secured to a support and the mechanism operated by non-resilient control means acting on either or both stems 15 and 17 the structure will function exactly like the basic structure of Figure 1. Or if an external resilient element is included in the control linkage externally used to control the structure by positioning stem 15 then the structure of Figure 2 will become compensative like the structure of Figure 3 which will now be explained.

Referring to Figure 3 is is seen that the hollow axial upper boss 56a of upper body part 11b has been elongated over boss 56 shown in Figure 2 and compression spring 57 has been interposed between the end 20b of stem 15 and the end 20a of exhaust valve box 14a. Parts 20a and 20b are smoothly guided for free axial movement in bore 23b of boss 56a. With this arrangement, in accordance with the seventh above stated object, when the operating stem 15 is positioned by any desired external control linkage to close exhaust valve seat 27 of exhaust valve box 14a on exhaust valve 41 of valve box 16 to isolate the air motor or load device attached to outlet 34 from the atmosphere and to open main valve seat 36 from valve 18 to allow air from a source of air under pressure attached to inlet 31 to enter space 51 and be impressed on the air motor or load device. Then the pressure of the air in space 51 reacts on the underside of diaphragm 52 to move diaphragm 52 upwardly taking with it exhaust box 14a against the downward bias of spring 57 until the added strain on spring 57 compensates for the upward reaction of the air in space 51 on diaphragm 52 and valve boxes 14a and 16 come to rest at a position of stress of spring 57 and of air pressure in space 51 pre-set by the position of stem 15.

Similarly if the operating stem 17 is positioned by any attached external control linkage to allow valve box 16 to close exhaust valve 41 of valve box 16 on exhaust valve seat 27 of exhaust valve box 14a and to open valve 18 from valve seat 36, the reaction of air under pressure in space 41 will move diaphragm 52 upwardly until the consequent strain of spring 57 and the added stress built up therein compensates for the reaction of air in space 51 on diaphragm 52 and valve boxes 14a and 16 come to rest with both main and exhaust valves closed at a pressure in space 51 pre-set by the position of stem 17.

It is thus seen that the structure of Figure 1 and the structure of Figure 2 can either of them be operated from either end to apply air at a pre-set pressure to an air operative device or alternately to exhaust the air operative device to atmosphere but neither of them can modulate the air pressure supplied the device.

Again it is seen that the structure of Figure 2 is reactive in function and with a compensating resilient means external to the structure it can be operated compensatively from either end like the structure of Figure 3 to modulate its load air pressure in response to the controlling means when operated from either end. When the structure of Figure 2 is thus operated compensatively it is understood that the bias of the resilient means, not shown, inserted between the operating control means, not shown, and stem 15 will always be sufficient to prevent part 20a of exhaust box 15a from striking C-ring 29.

In Figure 4 is shown a valve structure which can be operated from one end reactively only like the structure of Figure 2 and from the other end compensatively like the structure of Figure 3. Thus in Figure 4 upper body casting 11b differs from part 11a of Figure 2 in the removal therefrom of the upwardly extending boss 56 and the replacement thereof with spring turret 24 secured to part 11b as shown by screws 58. Stem 15 is freely slidably guided in an axial hole through the top of turret 24. Spring 57a is strained between the inner flat top surface of turret 24 and spring cup 59 resting on the flat top outer surface of part 11b as shown but freely slidable upward in turret 24 when contacted by head 20a of exhaust valve box 14a.

It is seen that in operation from stem 17 with stem 15 in fixed position the operation of the structure of Figure 4 will be like that of Figure 1 or Figure 2. In operation from stem 17 with stem 15 externally unrestrained the operation of the structure of Figure 4 will be like that of Figure 3 for in operation valve box 14a will always be in its axial range in which spring cap 59 will be up off its seat on the top of part 11b. In operation from stem 15 with stem 17 fixed in position the operation will be like that of Figure 2 unless a resilient biasing means is interposed between stem 15 and its operating means in which case the functional operation will be like that of the structure of Figure 3. It is seen that in accordance with the above stated eighth object of the invention the structure of Figure 4 operates reactively when operated from stem 15 outside the range of spring 57a and operates compensatively from stem 17 with stem 15 free to move into the range of spring 57a.

In Figure 5, in schematic form and without regard to construction necessities is shown the functional structure of the emergency air relay valve 19 of Figures 1 and 2 of Patent No. 2,772,926 referred to above.

It is to be noted that in the structure of Figure 5 the part above diaphragm 52 when opening 139 in upper body part 11c is open to atmosphere is functionally the same as the part of the structure of Figure 4 when stem 15 is unrestrained. That is to say when the structure of Figure 5 in the condition indicated is operated from stem 17a, air in space 51 and therefore applied to air load devices attached to openings 34 is passed by main valve 18 through port 35 from space 50 which received air from a source of air under pressure through ports 31a or 31b. Since, when main valve 18 is off its seat 36, the air pressure in space 50 is the same as the air pressure in space 51, valve box 16 will be moved upward by spring 40 until seat 36 closes on valve 18 or until exhaust valve 41 closes on its seat 27. Diaphragm 52 is urged by the air pressure in space 51 to raise exhaust valve seat 27 from valve 41 against the bias of spring 57a which counteracts the upward force of valve box 14b on spring cup 59. It is seen that for every position of stem 17a above its lowest position in which spring cup 59 rests on valve box 14b and both the exhaust valve and the main valve are closed there will be a corresponding air pressure in space 51 the amount of which will be pre-set by the characteristics selected for spring 57a.

But when in the Figure 5 structure it is assumed that the structure is to be operated by control from its upper end and lower stem 17a is fixed in position as it would be if opening 31a were plugged and opening 31b connected to a source of air under pressure, we have a condition functionally similar to that of the device of Figure 3 when the operation is from stem 15 and stem 17 is restrained in selected vertical position. In the Figure 3 structure operation is by stem 15 through resilient compression spring 57 to position valve box 14a to close exhaust valve seat 27 on exhaust valve 41 and then lower main valve seat 36 away from main valve 18 to admit air under pressure from space 50 to space 51, the reaction of the air admitted to space 51 on diaphragm 52 raises exhaust valve box 14a to allow spring 40 to close main valve seat 36 on main valve 18 and to raise valve box 14a sufficiently farther to exhaust air from space 51 until the pressure on the underside of diaphragm 52 is exactly compensated for by the bias of spring 57. In like manner in the Figure 5 structure the upper end control is by air under controlled pressure applied to space 109 through opening 139 so that the air under controlled pressure takes the place of mechanical force applied to stem 15 in Figure 3 and the resilience of the fluid air takes the place of compression spring 57 and the functional operations of the Figure 3 and Figure 5 structures are identical.

It has been shown that with stem 17a fixed in position the structure of Figure 5 can be operated as desired by use of a separate supply of modulated air at opening 139 to supply air under pressure from opening 31a or 31b through the main valve 18—36 to space 51 where it reacts on diaphragm 52 and is compensated by control air in space 109 to feed load air from openings 34 at substantially the exact pressure of the air in space 109. Also it has been shown that without pressure on space 109 varying the vertical position of stem 17a will supply air under pressure from inlets 31a or 31b through main valve 18—36 to space 51 where it will react on diaphragm 52 to be compensated by spring 57a to control the pressure of air in space 51 as determined by the vertical position of stem 17a.

As usefully applied in the system described in the above mentioned Patent No. 2,772,926, an air storage or emergency tank is connected to opening 31a of the Figure 5 structure, a source of air under pressure is connected to the 31b opening, air powered operators for vehicle wheel brakes are connected to openings 34 and control air throttled by the driver of the vehicle is connected to opening 139.

Since the diameter of space 75 is greater than the diameter of space 50 the downward pressure on piston 79, sealed by O-ring 86 to the cylindrical wall of the space 75, of the air in space 75 is greater than the upward pressure of the air in space 50 on the underside of valve 18 and valve box 16 sealed to the cylindrical wall of space 50 by O-ring 39, the air under pressure in space 75 will hold piston 79 and stem 17a in the position shown. Air under pressure from space 75 will flow through annular valve port 76 and out opening 31a to fill the storage tank with air at the air supply pressure.

In normal operation in response to modulated air supplied through control air inlet 139 to space 109 wheel brake operating air similarly modulated will be applied to the wheel brake operators from space 51. But if at any time a leak should develop in the air supply line to opening 31b and the pressure in space 75 should drop the annular port 76 is sufficiently restricted to delay a backward equalization of pressure from space 50 to space 75 until relatively weak spring 81 will move stem 17a upward and cause O-ring valve 77 to close port 76. At the same time main valve 18—36 will open to allow air from the storage tank through inlet 31a and space 50 to flow to space 51 and to the wheel brake operators connected to outlets 34. Depending on the condition of the leak, stem 17a will be vertically positioned to supply air to the brake operators which air is modulated in pressure due to the compensating action of spring 57a. The lower the pressure in space 75 becomes the farther upward stem 17a moves and the greater operating air pressure is applied to the brakes until the upward travel of stem 17a is stopped by nut 87, threaded on the lower end of stem 17a, coming into contact with the lower side of body casting 12c. Nut 87 limits the emergency application of brake air pressure to a total amount intended to prevent loss of control by skidding wheels.

Having thus listed some of the objects of this invention, illustrated and described the basic structure thereof together with additional applications in which the basic structure is used and described the operation of the basic structure and its applications, we claim:

1. A fluid valve mechanism comprising a hollow body formed with a first cylindrical inner surface and a second cylindrical inner surface axially spaced therefrom and coaxial therewith, a hollow valve box formed with a cylindrical outer surface sealed to said first cylindrical surface for coaxial movement therealong, a hollow exhaust box formed with a cylindrical outer surface guided on said second cylindrical inner surface for coaxial movement therealong, one end of said valve box being adjacent one end of said exhaust box, said one end of said exhaust box having an exhaust port formed therethrough, an exhaust valve seat formed around said exhaust port on said one end of said exhaust box, an exhaust valve carried on said one end of said valve box, means biasing said valve box towards said exhaust box for closure of said exhaust valve on said exhaust valve seat to close said exhaust port, a main valve port formed through said other end of said valve box coaxially therewith, a main valve seat formed around said main valve port interiorly of said valve box, a main valve within said valve box, a main valve stem supported on said hollow body for movement axially of said valve box, said main valve being secured to said main valve stem for movement therewith in one direction first to close said main valve on said main valve seat and then to move said valve box against the force of said biasing means to raise said exhaust valve from said exhaust valve seat and for movement in the other direction first to allow said biasing means to move said valve box to close said exhaust valve on said exhaust valve seat and then to raise said main valve from said main valve seat, the interior of said hollow body including means forming a supply air chamber and means forming a load air chamber, said supply air chamber and said load air chamber being connected by said main valve port and means forming an exhaust air chamber connected with said load air chamber by said exhaust air port, said load air chamber including the interior of said valve box and said exhaust air chamber including the interior of said exhaust box.

2. The valve mechanism of claim 1 in which said means biasing said valve box towards said exhaust box for closure of said exhaust valve on said exhaust valve seat also biases said valve box towards closure of said main valve seat on said main valve.

3. The valve mechanism of claim 1 including means adapted to position said exhaust box longitudinally of the axis of both said valves thereby to determine a longitudinal position of said valve box at which both said valves are closed.

4. The valve mechanism of claim 1 in which said means forming a load air chamber and said means forming an exhaust air chamber include a flexible diaphragm with said exhaust box secured axially thereto and therethrough, whereby said exhaust box will be biased towards the open position of said exhaust valve by the pressure on said diaphragm of the air in said load air chamber.

5. The valve mechanism of claim 4 including resilient means biasing said exhaust box towards the closed position of said exhaust valve seat on said exhaust valve.

6. The valve mechanism of claim 5 including means for varying the biasing force of said biasing means.

7. The valve mechanism of claim 5 including means for restricting the range of axial travel of said exhaust box over which said resilient biasing means is effective and means adapted to position said exhaust box over its entire range of travel against the bias of the pressure on said diaphragm of the air in said load air chamber.

8. The valve mechanism of claim 1 including means forming a control air chamber within said hollow body, said control air chamber being opened to the exterior of said hollow body by a control air port formed through a wall thereof and in which said means forming a load air chamber and said means forming a control air chamber include a flexible diaphragm with said exhaust box secured axially thereto and therethrough, whereby said exhaust box will be biased towards the open position of said exhaust valve by the pressure on said diaphragm of the air in said load air chamber and towards the closed position of said exhaust valve by the pressure on said diaphragm of the air in said control air chamber.

9. The valve mechanism of claim 8 including resilient means effective over part of the range of travel of said exhaust box to bias said exhaust box towards the closed position of said exhaust valve seat on said exhaust valve.

10. The valve mechanism of claim 1 including resilient means biasing said exhaust box towards the closed position of said exhaust valve seat on said exhaust valve.

11. The valve mechanism of claim 1 including means sealing said outer cylindrical surface of said exhaust box to said second cylindrical inner surface of said hollow body.

12. A fluid valve mechanism comprising a hollow valve body with means forming an air supply inlet thereinto, means forming a load air outlet therefrom, means forming an exhaust air outlet therefrom, a main air valve means adapted to control the air passed by said valve mechanism from said air supply to said load air outlet, an exhaust air valve means coaxial with said main air valve means adapted to control the air passed by said valve mechanism from said load air outlet to said exhaust outlet, a first operating means operable for axial movement of one of said valve means for overlappingly operating both said valve means whereby only one of said valve means may be opened at a time and a second operating means operable for axial movement of the other of said valve means for overlappingly operating both said valve means.

13. The mechanism of claim 12 including diaphragm means adapted to be influenced by an increase in the pressure of load air supplied by said mechanism to react against one of said operating means to urge said one of said operating means towards a lower load air pressure position.

14. The mechanism of claim 13 in which said one of said operating means includes a resilient means adapted to bias said one of said operating means against the reaction on said diaphragm of said load air pressure whereby when either of said operating means are moved to change the overlap positions of said valves to increase the pressure of said load air the increased reaction on said diaphragm of said increase in load air pressure will react against said resilient means to compensate for said movement of either of said operating means by resetting said one of said operating means to its previous overlapping position.

15. The valve mechanism of claim 12 in which said hollow body includes means forming an inlet air chamber separated from said supply air chamber by means forming a cylindrical supply air port coaxial with said main valve means, said main valve means including a main valve stem passing loosely through said supply air port into said inlet chamber, means limiting the travel of said main valve stem in either of its axial directions, a third valve means carried on said main valve stem in said inlet air chamber when said main valve stem is near the limit of its travel in the closing direction of said main valve on its main valve seat and movable with said main valve stem into said supply air port to close said supply air port when said main valve stem moves a pre-set distance in the direction to raise said main valve from its main valve seat, resilient means biasing said main valve stem in the closing direction of said supply air port by said third valve means carried on said stem and the opening direction of said main valve from said main valve seat, piston means secured to said main valve stem in said inlet air chamber responsive to the air pressure in said inlet chamber to overcome said main valve stem resilient biasing means to hold said third valve means on said main valve stem clear of said supply air port in said inlet chamber and inlet air port means formed in a wall of said inlet air chamber.

References Cited in the file of this patent

UNITED STATES PATENTS

| | | |
|---|---|---|
| 1,747,910 | Siefarth | Feb. 18, 1930 |
| 2,171,613 | Vance | Sept. 5, 1939 |
| 2,656,014 | Fites | Oct. 20, 1953 |
| 2,657,701 | Hopp | Nov. 3, 1953 |
| 2,682,282 | Trevaskis | June 29, 1954 |
| 2,772,926 | Fishwood et al. | Dec. 4, 1956 |
| 2,812,218 | Fitch | Nov. 5, 1957 |

FOREIGN PATENTS

| | | |
|---|---|---|
| 527,495 | Canada | July 10, 1956 |